Sept. 2, 1958         E. UDERSTADT         2,850,249
ARRANGEMENTS FOR SELECTIVELY ACTUATING CONTROL
DEVICES BY MEANS OF A MOVABLE MAGNET
Filed Feb. 6, 1956         2 Sheets-Sheet 1

INVENTOR
E. UDERSTADT
BY
ATTORNEY

Sept. 2, 1958  E. UDERSTADT  2,850,249
ARRANGEMENTS FOR SELECTIVELY ACTUATING CONTROL
DEVICES BY MEANS OF A MOVABLE MAGNET
Filed Feb. 6, 1956  2 Sheets-Sheet 2

INVENTOR
E. UDERSTADT
BY
ATTORNEY

United States Patent Office 2,850,249
Patented Sept. 2, 1958

2,850,249

ARRANGEMENTS FOR SELECTIVELY ACTUATING CONTROL DEVICES BY MEANS OF A MOVABLE MAGNET

Erich Uderstadt, Klein-Machnow, Germany, assignor to International Standard Electric Corporation, New York, N. Y., a corporation of Delaware Application February 6, 1956, Serial No. 563,738

Claims priority, application Germany February 14, 1955

2 Claims. (Cl. 243—16)

This invention relates to control systems particularly for use in dispatch tube systems and railroad signalling systems in which it is required to give signals from the carrier or vehicle in motion to stationary equipment in order to effect required control or directing operation.

According to one feature of my invention an arrangement for selectively actuating control devices comprises a movable magnet, a plurality of fixed magnets arranged in a line and spaced apart with the like poles of juxtaposed magnets facing each other, means for varying the position of the movable magnet to bring it adjacent the gap between any two of the fixed magnets and a field sensing test device associated with each of such fixed magnets.

This and other features and objects of my invention will be clear from the following description taken in conjunction with the accompanying drawings in which Fig. 1 shows schematically an arrangement which has already been proposed and which will be referred to in explanation of my invention;

Figure 1:
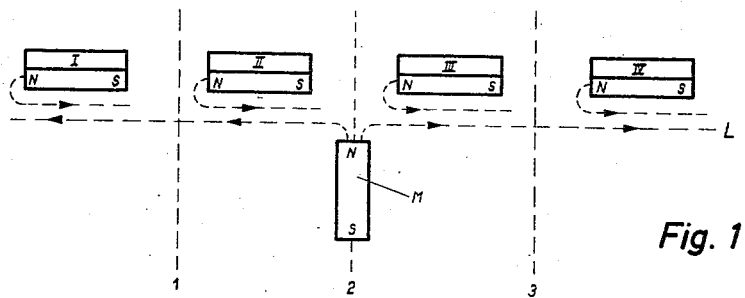

In the arrangement shown in Fig. 1, the fixed devices I, II, III and IV are arranged along a straight line in a plane at right angles to the track of the vehicle and spaced apart so as to form gaps between them. Each such device comprises a magnet, the north pole of each being on the left-hand side and the south pole on the right-hand side so that unlike poles of the respective magnets face each other. A movable magnet M is positioned so that its north-south axis is at right angles to the line L. As indicated in the drawing, the north pole of the magnet M is facing the gap between the two devices II and III. It will thus be seen that the lines of force emanating from it will be added to the lines of force set up by magnets of devices III and IV, but will be in opposition to the lines of force from the magnets of the devices I and II. Thus the magnetic action on the devices III and IV will be increased, while that on the devices I and II will be decreased. The devices I to IV may have associated therewith any suitable field testing means whereby a selective action will be obtained dependent upon the position of the movable magnet M.

In the above-described arrangement the disadvantage exists that since the movable magnet M has to be maintained at right angles to the line of travel L, the means for mounting and displacing it require, in many instances, too much space.

Figure 2:
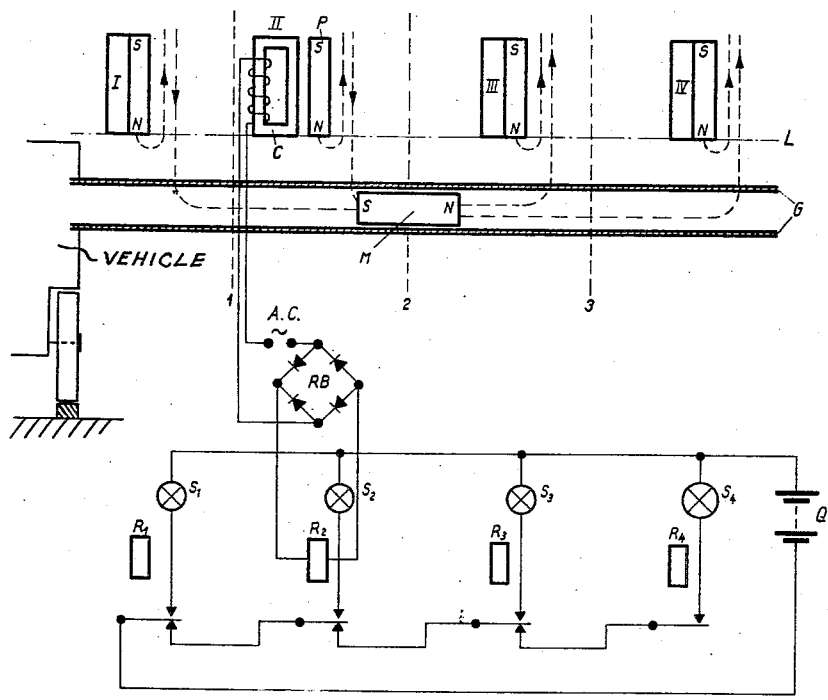
Fig. 2 shows one embodiment of an arrangement according to my invention.

Referring to the arrangement of Fig. 2 which shows one embodiment of my invention, the movable magnet M is so positioned that its longitudinal north-south axis is parallel to the line L along which the fixed devices I to IV are arranged. The movable magnet M is also arranged to be displaceable on a line parallel to the line L, as for example, by positioning it between the parallel guide members G, diagrammatically represented in Fig. 2. This permits a substantial reduction of the space required for the path of displacement of the movable magnet M over the arrangement of Fig. 1.

In Fig. 2 the magnets of the devices I and IV are positioned at right-angles to the line L, their north poles being shown as facing this line while their south poles are remote therefrom. It will be appreciated, however, that the arrangement of all the fixed magnets could be reversed, that is to say, the south poles may face the line L, and the north poles be turned away from it.

The movable magnet M is arranged with its north-south axis parallel to the line L, its north pole being on the right-hand side in the drawing and its south pole on the left. It will be seen that the lines of force pass by the magnets of the devices III and IV and return past the magnets of the devices I and II, as is indicated by the arrows. In this manner the lines of force from the fixed magnets of the devices I and II run in opposition to those of the magnet M and the fields of I and II will hence be decreased in strength. The lines of force from the magnets of the devices III and IV, however, run in the same direction as those of the magnet M and accordingly the fields of the devices III and IV will be increased in strength.

The arrangement of the field sensing means associated with each of the devices I to IV is illustrated with respect to the device II only, those of the other devices I, III and IV being similar. An iron-core choke C pre-magnetized by a permanent magnet P is included in a circuit comprising an alternating current source AC and a rectifier bridge RB. The conjugate diagonal of the bridge RB is connected to the winding of a relay R2. The movable magnet M approaching the choke C and magnet P changes the inductance of the choke, causing the energization or de-energization of the relay R2, dependent upon whether the field adjacent the device II is intensified or reduced. It will be noted, however, that since the lines of force flowing past both of the devices III and IV are in aiding relationship, both of these devices III and IV will be similarly affected and means must therefor be provided so that the sensing device which is first excited will disconnect any other such devices excited in the same manner, but later than the first device. For this purpose the armatures of the relays R1 to R4 are connected in a chain circuit including their respective back contacts and the battery Q, their respective front contacts being connected to control devices diagrammatically represented S1 to S4. Thus when the relay R2, for example, is operated, a circuit is closed for its control device S2 over its front contact, but at its back contact the battery Q is disconnected from the armatures of relays R3 and R4.

The principle disclosed in Fig. 2 is particularly suitable for use in dispatch tube systems in order to control the routing switches or signals thereof, the devices I to IV then serving as sensing or test devices. In this case the movable magnets, such as M, will be mounted on the dispatch carriers or containers, either on an end face or on the circumferential surface in a manner such as to render them rotatable or displaceable while requiring but little space.

Figure 3:
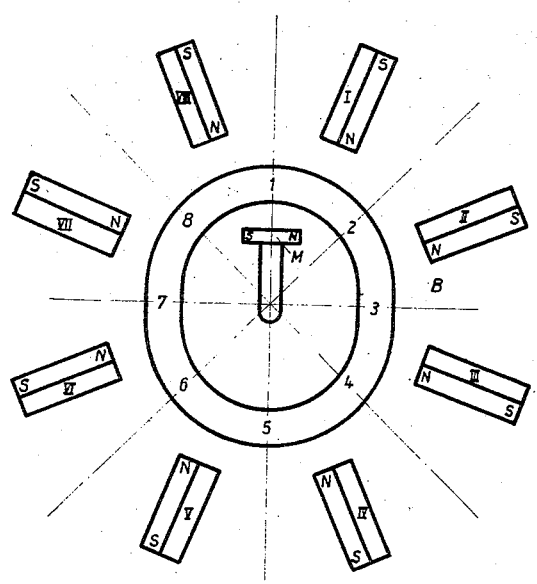
Fig. 3 illustrates diagrammatically how my invention may be applied to a dispatch tube system.

An example of such an arrangement is shown in Fig. 3, in which eight sensing devices I to VIII are shown, which are fixedly mounted around a non-ferromagnetic dispatch tube in a plane at right angles to the axis of the tube. A carrier is provided on one of its end faces with a movable magnet M fixed to an arm pivoted at the center of the tube so that it may be given any one of the eight radial positions indicated by the numerals 1 to 8. The sensing devices I to VIII are connected with control arrangements in such manner that either the intensified or reduced electro-magnetic fields will initiate a control action in a desired one of the devices I to VIII, or so that each of these fields will initiate control actions different from each other in accordance with differently designed control or sensing devices. Arrangements will be provided similar to that illustrated in Fig. 2 so that the sensing device excited first shall disable any other such device similarly excited at a later time. Thus, with the movable magnet M in the position represented in Fig. 3, the sensing device I only will be caused to initiate a control action.

In order to prevent the carrier from turning when traveling through the dispatch tube, the carriers are preferably made to have a cross-sectional shape different from a circle. Any disadvantage arising from such non-circular cross section due to dissymmetry of the electro-magnetic lines of force may be avoided by appropriately arranging the sensing devices and the movable magnet.

While I have described above the principles of my invention in connection with specific apparatus, it is to be clearly understood that this description is made only by way of example and not as a limitation to the scope of my invention.

What is claimed is:

1. Arrangement for selectively directing a carrier in a dispatch tube system, comprising a plurality of magnets arranged around the dispatch tube in a plane at right-angles to its longitudinal axis and spaced apart with the like poles of each facing towards the center of said tube, a movable magnet mounted on said carrier, means for rotating said movable magnet to bring it adjacent the gap between any two of said fixed magnets during its passage through the tube whilst retaining its longitudinal north-south axis substantially normal to the north-south axis of said fixed magnets, and a field sensing device associated with each of said fixed magnets.

2. Arrangement for selectively actuating track control devices comprising a track, a vehicle movable along said track, a plurality of fixed magnets arranged along a line in a plane at right angles to said track and spaced apart with their north-south axes extending along parallel lines and their like poles facing towards the same direction, a pair of parallel guide members mounted on said vehicle and extending along lines at right angles to said track and in such position that during the travel of said vehicle along said track said guide members pass adjacent like poles of all said fixed magnets, a movable magnet mounted to slide between said guide members with its north-south axis parallel to said guide members whereby it may be brought adjacent the gap between any two of said fixed magnets during the travel of said vehicle along said track, and a field sensing test device associated with each of said fixed magnets.

References Cited in the file of this patent

FOREIGN PATENTS

| | | |
|---|---|---|
| 323,067 | Great Britain | Dec. 24, 1929 |
| 489,701 | Germany | Jan. 18, 1930 |
| 603,042 | Germany | Sept. 21, 1934 |